United States Patent
Enguent

[11] Patent Number: 6,034,651
[45] Date of Patent: Mar. 7, 2000

[54] ANTENNA COIL WITH REDUCED ELECTRICAL FIELD

[75] Inventor: Jean-Pierre Enguent, Saint Savournin, France

[73] Assignee: STMicroelectronics S.A., Gentilly, France

[21] Appl. No.: 09/193,528

[22] Filed: Nov. 17, 1998

[30] Foreign Application Priority Data

Nov. 18, 1997 [FR] France ................................. 97 14684

[51] Int. Cl.[7] ....................................... H01R 1/36
[52] U.S. Cl. ......................... 343/895; 343/866; 340/572
[58] Field of Search .................... 343/741, 742, 343/866, 867, 873, 895; 340/505, 572, 825.31; 29/600; 336/200, 205

[56] References Cited

U.S. PATENT DOCUMENTS

| | | | |
|---|---|---|---|
| 4,451,812 | 5/1984 | Vescovi et al. | 336/84 C |
| 5,574,470 | 11/1996 | De Vall | 343/895 |
| 5,598,327 | 1/1997 | Somerville et al. | 363/131 |
| 5,608,417 | 3/1997 | De Vall | 343/867 |
| 5,808,587 | 9/1998 | Shima | 343/895 |

FOREIGN PATENT DOCUMENTS

| | | | | |
|---|---|---|---|---|
| 195 42 900 A1 | 5/1997 | Germany | | G06K 19/07 |

*Primary Examiner*—Hoanganh Le
*Assistant Examiner*—Tan Ho
*Attorney, Agent, or Firm*—Theodore E. Galanthay; Allen, Dyer, Doppelt, Milbrath & Gilchrist, P.A.

[57] ABSTRACT

An antenna coil with low electrical field emissions comprises a flat winding with a specified shape and a conductive screen facing the winding. The conductive screen has substantially the same shape as the winding, and includes a cut-off zone. The screen neutralizes the parasitic electrical field emitted by the winding without disturbing the useful magnetic field which is axially oriented (i.e., oriented perpendicularly to the plane of the coil). Such an antenna coil is applicable to a station for the transmission-reception of data by inductive coupling.

27 Claims, 3 Drawing Sheets

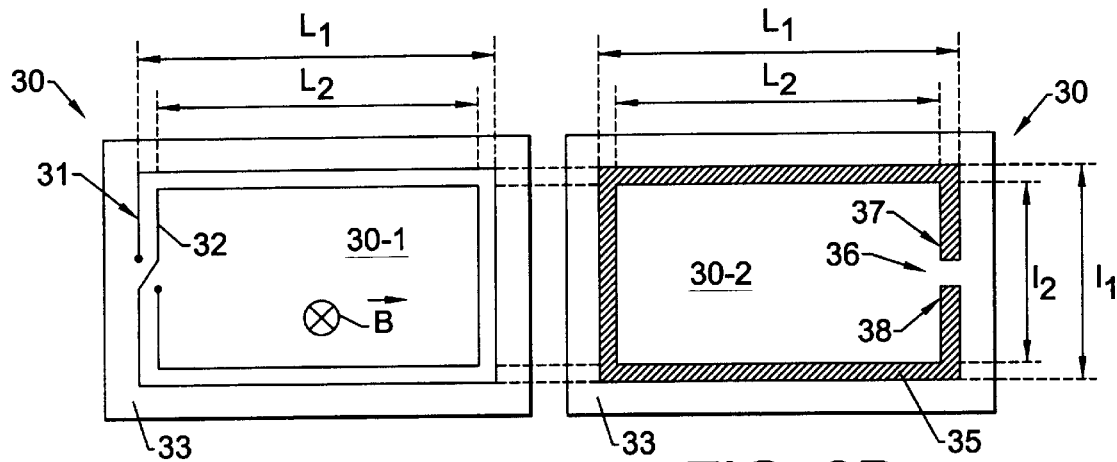
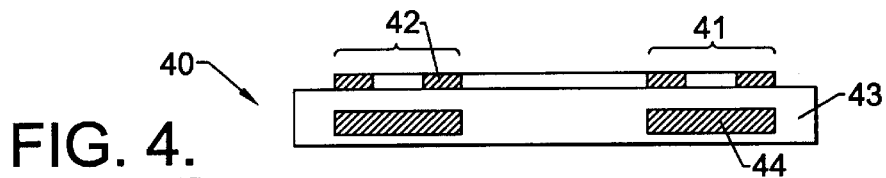
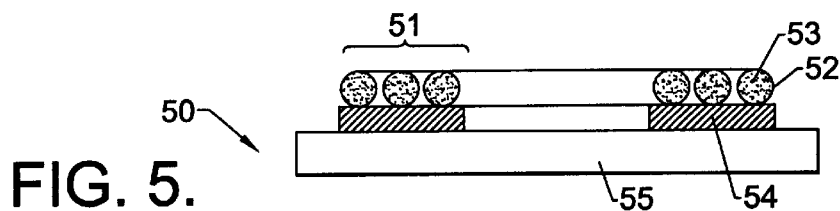
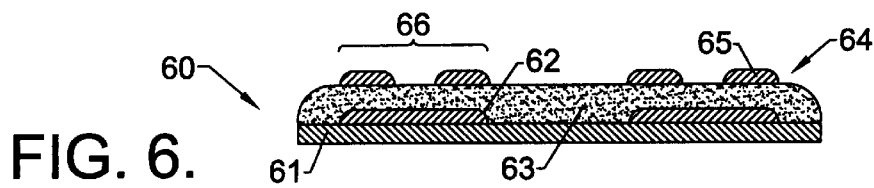
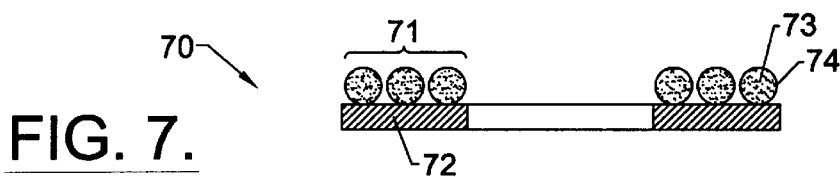

ANTENNA COIL WITH REDUCED ELECTRICAL FIELD

FIELD OF THE INVENTION

The present invention relates to antennas and, more particularly, to an antenna coil for a station for the transmission/reception of data by inductive coupling.

BACKGROUND OF THE INVENTION

FIG. 1 shows a prior art system for the transmission of data by inductive coupling. The system comprises a transceiver station 10 and a transponder type passive module 20, such as an integrated circuit of a contactless chip card. The station 10 comprises an antenna coil 11 forming a resonant circuit 13 with a capacitor 10. The resonant circuit 13 is excited by an AC voltage Vac1 emitted by a generator 14. Facing the station 10, the module 20 has a reception coil 21 forming a resonant circuit 23 with a capacitor 22. This resonant circuit 23 is tuned to the resonant circuit 13 of the station 10.

For the transmission of digital data $DT_{1,2}$ from the station 10 to the module 20, the voltage Vac1 is amplitude-modulated by an encoder-modulator circuit 15 receiving the data $DT_{1,2}$ to be transmitted. By inductive coupling between the coils 11 and 21, the module 20 receives an induced voltage Vac2 which is a replica of the voltage Vac1, including maximum and minimum values of amplitude. The demodulation of the voltage Vac2 is performed by a demodulator-decoder circuit 25 which provides at an output the data elements $DT_{1,2}$.

The transmission of data $DT_{2,1}$ in the opposite direction, namely from the module 20 to the station 10, relies on a substantially different method known as a load modulation method. This method includes modulating the impedance of the coil 21, for example, by means of a resistor 26 switched over by a switch 27. The switch 27 is alternately closed and opened by an encoder circuit 28 receiving the data inputs $DT_{2,1}$ to be transmitted. The variation of the impedance of the coil 21 is passed on by inductive coupling to the coil 11 of the station 10 and causes modulation of the excitation current or voltage Vac1 in the station 10. A detector-decoder circuit 16 comprises, for example, means for measuring the excitation current or excitation voltage Vac1. The detector-decoder circuit 16 detects the opening and closing of the switch 27 and, from this, determines the data $DT_{2,1}$ sent by the module 20.

The various circuits mentioned above are well known to those skilled in the art and shall not be described in detail. We shall now look at the practical approaches of a system of this kind and, more particularly, an approach for station 10. In practice, it is desired to make the station 10 in very compact form with a minimum volume. One approach, as illustrated in FIG. 2, is to arrange the various circuits 14 to 16 and the capacitor 12 on a common interconnection support, e.g., a printed circuit card 17. The antenna coil 11 is also made to be compact and takes the form of flat winding 18 arranged on an insulator support 19 fixed to the printed circuit card 17, e.g., in a perpendicular position.

Although this approach for station 10 is satisfactory in terms of space requirements, the Applicant has realized that positioning of the coil 11 in the vicinity of the electronic circuit appreciably disturbs operation of the station 10. The cause of this disturbance is a parasitic electrical field E emitted by the coil 11 together with the useful magnetic field B (see FIG. 2) which generates parasitic voltages of some microvolts in the conductors. In particular, the electrical field E causes deterioration in the signal-to-noise ratio in a reception mode and disturbs the detection of the very small load modulations when the distance d (see FIG. 1) between the station 10 and the module 20 is great and the inductive coupling between the coils 11, 21 is very low.

One way to overcome this drawback includes placing the printed circuit card 17 in a sheathed metal box, with the coil 11 being placed outside the box. However, this approach has a disadvantage of being costly. Furthermore, this approach leads to an increase in the volume of the station 10, since the coil 11 has to be at a distance from the box so that the magnetic flux B can flow freely without being disturbed by the walls of the box.

SUMMARY OF THE INVENTION

Thus, an objective of the present invention is to provide a coil with low electrical field emissions. This objective is achieved by providing a coil comprising a flat winding of a specified shape and a conductive screen positioned to face the winding. The conductive screen is substantially the same shape as the winding and comprises a cut-off zone to form an open-loop circuit. For example, the winding of the coil and the screen may be rectangular, ring-shaped, etc.

According to one approach, the winding is positioned on one face of an insulating plate, and the screen is positioned on the other face or in the thickness of the insulating plate. According to another approach, the winding is positioned on the screen with the interposing of an electrically insulating material. According to yet another approach, the winding is directly positioned on the screen. In practice, the winding may be formed from a conductive track or an electrical wire.

The present invention also relates to a station for the transmission and reception of data by inductive coupling comprising a coil according to the invention forming the antenna coil.

BRIEF DESCRIPTION OF THE DRAWINGS

These features and advantages of the invention shall be explained in greater detail in the following description with respect to various embodiments of according to the invention, and made with reference to the appended figures, of which:

FIGS. 3a and 3b respectively show the front face and the rear face of a coil according to the invention; and FIGS. 4 to 7 are sectional views of embodiments of a coil according to the invention.

DETAILED DESCRIPTION OF THE PREFERRED EMBODIMENTS

Figure 1:
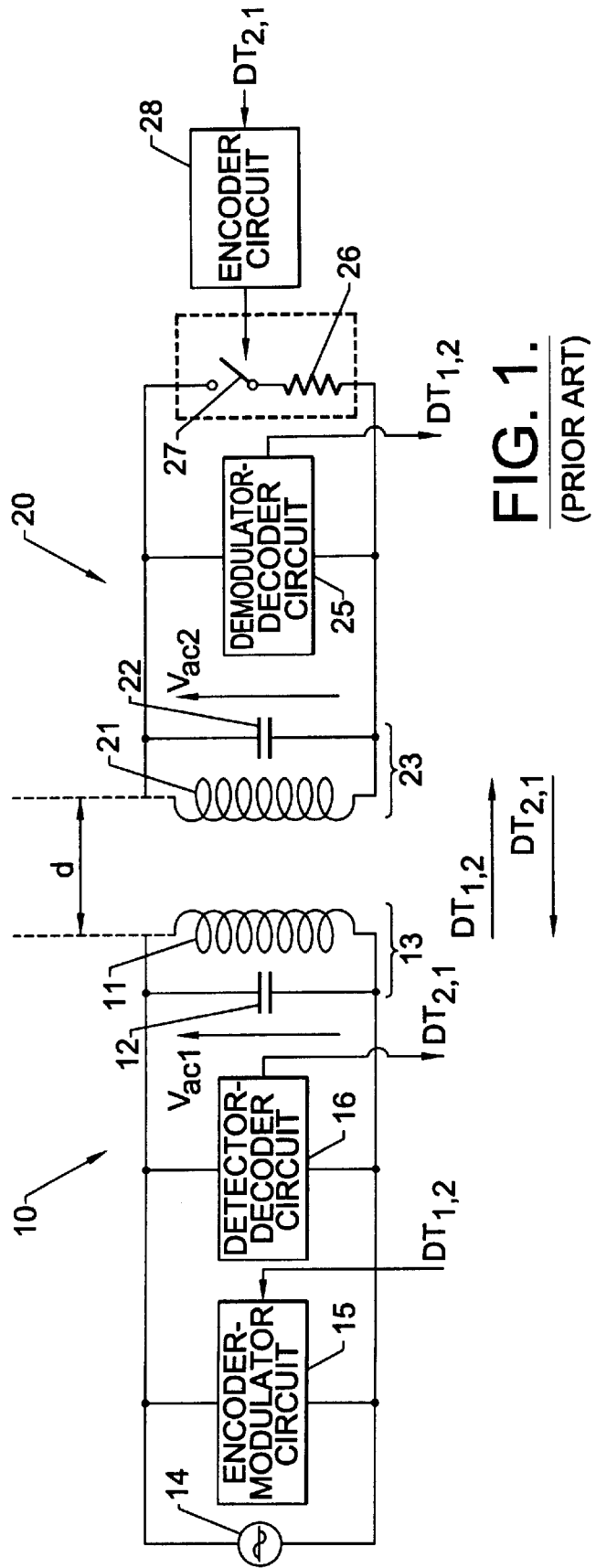
FIG. 1 shows a system for the transmission of data by inductive coupling comprising a station and a transponder module according to the prior art.

FIGS. 3a and 3b respectively show the front face 30-1 and the rear face 30-2 of a coil 30 according to the invention. As shown on the front face 30-1, the coil 30 conventionally has a flat winding 31 formed by a spiral metal track 32 placed on an insulating plate 33. The winding 31 has two turns and has the shape of a frame with external dimensions L1 and l1 and inner dimensions L2 and l2.

According to the invention, the rear face 30-2 of the coil 30 has a metal screen 35 connected to the plate 33. The screen 35 has the same shape as the winding 31 and its location on the rear face 30-2 coincides with the position of the winding 31 on the front face 30-1. Thus, the screen 35 takes the form of a frame with external dimensions L1, l1 and internal dimensions L2, l2. The screen 35 furthermore has a cut-off zone 36 and thus forms an open-loop conductive circuit comprising two ends 37, 38 that do not meet.

Studies conducted by the Applicant have shown that a coil 30 fitted with a screen 35 has an advantage of emitting a weak electrical field that is reduced by 70% to 80% as compared with a conventional coil having the same structure. Thus, the screen 35, according to the invention, neutralizes the parasitic electrical field emitted by the winding 31 without disturbing the useful magnetic field B which is axially oriented (i.e., oriented perpendicularly to the plane of the coil 30). A major characteristic that enables this result to be obtained is the cut-off zone 36 without which the screen 35 would form a closed-loop circuit that would short-circuit the magnetic field B. The size and shape of the screen are also important parameters. For example, an increase in the size of the screen 35 beyond the limits given by the shape of the winding 31 would disturb the magnetic field B and modify the inductance L of the coil 30.

Alternatively, the coil 30 could take the form of several variations, especially with regards to the shape of the winding 31 and the number of turns that it comprises. For example, the winding 31 and the screen 35 could be ring-shaped. As previously stated, the coil, according to the invention, can have numerous variations depending on the manufacturing technology chosen. In FIGS. 3a and 3b, the winding 31 and the screen 35 are metallic and are made using printed-circuit technology. For example, the winding 31 and the screen 35 are made by chemical etching a two-faced plate made of copper/epoxy/copper. However, many other embodiments may be planned, as shown by the sectional views of FIGS. 4 to 6. To better illustrate these embodiments in these figures, the thicknesses of the coils shown are not drawn to scale and are substantially expanded.

FIG. 4 shows a coil 40 that can be formed as a multilayer printed circuit. As discussed above, the coil 40 has a winding 41 formed by a metal track 42 placed on the surface of an insulating plate 43, and a metal screen 44. Here, the screen 44 is not arranged on the back of the plate 43 but in its thickness.

FIG. 5 shows a coil 50 having a winding 51 formed by an electrical wire 52 provided with an insulating sheath 53. The winding 51 is arranged directly on a screen 54 according to the invention. The screen 54 is attached or joined to an insulating plate 55. The screen 54 is, for example, made by chemical etching and the electrical wire 52 is fixed to the screen 54 by bonding.

FIG. 6 shows a coil 60 that can be made using the technology of thick film circuits, e.g., screen process printing with conductive inks and insulating inks. Thin film circuits can also be used, e.g., the vacuum deposition of conductive materials and insulating materials. The coil 60 thus has a substrate 61, for example, made of aluminum $Al_2O_3$, on which there are stacked a first conductive layer 62 in the form of a screen according to the invention, a layer of dielectric material 63 and a second conductive layer 64. The second conductive layer 64 is deposited in a spiral conductive track pattern 65 and forms the winding of the coil 60.

Finally, FIG. 7 shows a coil 70 comprising simply a winding 71 made on a metal plate 72 cut out in the form of the winding 71 to form a screen, according to the invention. In this embodiment, the winding 71 is made by means of an electrical wire 73 provided with an insulating sheath 74.

Figure 2:
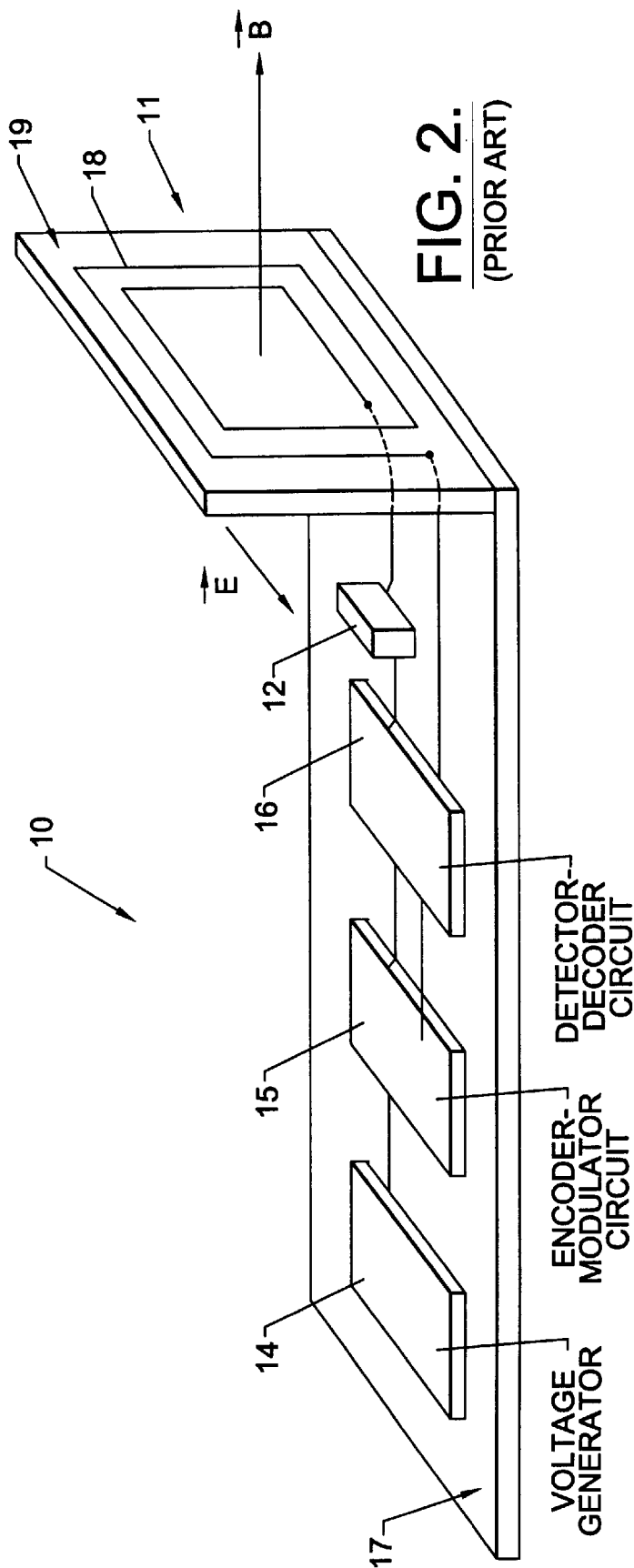
FIG. 2 shows a compact embodiment of the station of FIG. 1 according to the prior art.

In practice, a coil according to the invention may be used as the antenna coil of a transceiver station operating by inductive coupling, for example, as with respect to station 10 illustrated in FIG. 2. Through its low electrical radiation, the coil does not disturb the most sensitive circuits of the station 10 and can be used, in particular, to obtain a high signal-to-noise ratio in reception mode (detection of the load modulations). Of course, the present invention is not limited to this application alone, as was only described in the background for the purpose of presenting the specific technical problem that has led to the invention. More generally, a coil according to the invention can be used in all cases where it is desired to generate a magnetic field and minimize the emission of an electrical field.

That which is claimed is:

1. An antenna coil comprising:

a flat winding having a loop shape and comprising a plurality of electrical conductors arranged in side-by-side relation; and a conductive screen positioned facing the winding in a substantially parallel plane, said conductive screen having substantially the same shape as the winding and including a cut-off zone to form an open-loop circuit, said conductive screen comprising an electrical conductor having a width substantially coextensive within an adjacent portion of side-by-side electrical conductors of said flat winding.

2. The antenna coil according to claim 1, wherein the winding and the screen are rectangular-shaped.

3. The antenna coil according to claim 1, wherein the winding and the screen are ring-shaped.

4. The antenna coil according to claim 1, further comprising an insulating plate; and wherein the winding is positioned on one face of the insulating plate, and the screen is positioned on the other face of the insulating plate.

5. The antenna coil according to claim 1, further comprising an insulating plate; and wherein the winding is positioned on one face of the insulating plate, and the screen is positioned in a thickness of the insulating plate.

6. The antenna coil according to claim 1, further comprising an electrically insulating material; and wherein the winding is positioned on the screen interposed with the electrically insulating material.

7. The antenna coil according to claim 1, wherein the winding is directly positioned on the screen.

8. The antenna coil according to claim 1, wherein the winding comprises a conductive track.

9. The antenna coil according to claim 1, wherein the winding comprises an electrical wire.

10. A station for the transmission of data by inductive coupling comprising:

a generator for generating an AC voltage;

an encoder-modulator circuit for modulating the AC voltage corresponding to data to be transmitted; and a resonant circuit excited by the modulated AC voltage, said resonant circuit comprising a capacitor, and an antenna coil comprising a flat winding having a loop shape and comprising a plurality of electrical conductors arranged in side-by-side relation, and a conductive screen positioned facing the winding in a substantially parallel plane, said conductive screen having substantially the same shape as the winding and including a cut-off zone to form an open-loop circuit, said conductive screen comprising an electrical conductor having a width substantially coextensive within an adjacent portion of side-by-side electrical conductors of said flat winding.

11. The station according to claim 10, wherein the winding and the screen are rectangular-shaped.

12. The station according to claim 10, wherein the winding and the screen are ring-shaped.

13. The station according to claim 10, further comprising an insulating plate; and wherein the winding is positioned on one face of the insulating plate, and the screen is positioned on the other face of the insulating plate.

14. The station according to claim 10, further comprising an insulating plate; and wherein the winding is positioned on one face of the insulating plate, and the screen is positioned in a thickness of the insulating plate.

15. The station according to claim 10, further comprising an electrically insulating material; and wherein the winding is positioned on the screen interposed with the electrically insulating material.

16. The station according to claim 10, wherein the winding is directly positioned on the screen.

17. The station according to claim 10, wherein the winding comprises a conductive track.

18. The station according to claim 10, wherein the winding comprises an electrical wire.

19. The method for transmitting data by inductive coupling, said method comprising the steps of:

generating an AC voltage;

modulating the AC voltage corresponding to data to be transmitted; and exciting a resonant circuit by the modulated AC voltage, said resonant circuit comprising a capacitor and an antenna coil comprising a flat winding having a loop shape and comprising a plurality of electrical conductors arranged in side-by-side relation, and a conductive screen positioned facing the winding in a substantially parallel plane, said conductive screen having substantially the same shape as the winding and including a cut-off zone to form an open-loop circuit, said conductive screen comprising an electrical conductor having a width substantially coextensive within an adjacent portion of side-by-side electrical conductors of said flat winding.

20. The method according to claim 19, wherein the winding and the screen are rectangular-shaped.

21. The method according to claim 19, wherein the winding and the screen are ring-shaped.

22. The method according to claim 19, wherein the winding is positioned on one face of an insulating plate, the screen being positioned on the other face of the insulating plate.

23. The method according to claim 19, wherein the winding is positioned on one face of an insulating plate, the screen being positioned in a thickness of the insulating plate.

24. The method according to claim 19, wherein the winding is positioned on the screen interposed with an electrically insulating material.

25. The method according to claim 19, wherein the winding is directly positioned on the screen.

26. The method according to claim 19, wherein the winding comprises a conductive track.

27. The method according to claim 19, wherein the winding comprises an electrical wire.

* * * * *